(12) United States Patent
Pancari

(10) Patent No.: US 10,673,647 B2
(45) Date of Patent: Jun. 2, 2020

(54) DIGITAL MAILBOX

(71) Applicant: DIGITALITALY S.R.L. INNOVATIVA, Sovico (IT)

(72) Inventor: Massimiliano Antonio Pancari, Sovico (IT)

(73) Assignee: DIGITALITALY S.R.L. INNOVATIVA, Sovico (MB) (IT)

( * ) Notice: Subject to any disclaimer, the term of this patent is extended or adjusted under 35 U.S.C. 154(b) by 0 days.

(21) Appl. No.: 16/080,040

(22) PCT Filed: Sep. 25, 2017

(86) PCT No.: PCT/EP2017/074230
§ 371 (c)(1),
(2) Date: Aug. 27, 2018

(87) PCT Pub. No.: WO2018/060138
PCT Pub. Date: Apr. 5, 2018

(65) Prior Publication Data
US 2019/0068398 A1 Feb. 28, 2019

(30) Foreign Application Priority Data
Sep. 28, 2016 (IT) .................. 102016000097485

(51) Int. Cl.
*H04L 12/40* (2006.01)
*H04L 12/58* (2006.01)
(Continued)

(52) U.S. Cl.
CPC ..... *H04L 12/40006* (2013.01); *G06Q 10/107* (2013.01); *H04L 12/40104* (2013.01); *H04L 51/22* (2013.01); *H04L 51/28* (2013.01); *H04M 11/025* (2013.01)

(58) Field of Classification Search
CPC combination set(s) only.
See application file for complete search history.

(56) References Cited

U.S. PATENT DOCUMENTS

| 8,762,529 B1* | 6/2014 | Payne | ..................... H04L 51/28 709/225 |
| 2002/0029248 A1* | 3/2002 | Cook | ................... G06Q 10/107 709/206 |

(Continued)

FOREIGN PATENT DOCUMENTS

WO 2015177819 A1 11/2015

OTHER PUBLICATIONS

Italian Search Report for Corresponding Italian Application No. IT 201600097485 (5 pages) (May 10, 2017).
(Continued)

*Primary Examiner* — Yee F Lam
(74) *Attorney, Agent, or Firm* — Lucas & Mercanti, LLP

(57) ABSTRACT

The invention relates to a device for sending and receiving electronic files, which contain metadata having an addressee's electronic address. The device includes an internal module and an external module for sending and receiving electronic files. The external module is associated with a building and placed in a location accessible to an operator, for example integrated into a pre-existing interphone device. These modules are interconnected to receive and transmit data and are commonly powered by Power over Ethernet (PoE) technology. This technology also allows the addressee's electronic address contained in the metadata of the files received by the external module includes a MAC address uniquely associated with the addressee's internal module. In the case of multiple internal modules in the same building, a switch device to which several Ethernet ports are connected routes the file to the correct internal module.

10 Claims, 11 Drawing Sheets

(51) Int. Cl.
*H04M 11/02* (2006.01)
*G06Q 10/10* (2012.01)

(56) References Cited

U.S. PATENT DOCUMENTS

| | | | | |
|---|---|---|---|---|
| 2002/0059381 | A1* | 5/2002 | Cook | G06Q 10/107 709/206 |
| 2004/0117317 | A1* | 6/2004 | Feinman | G06Q 20/341 705/65 |
| 2005/0004705 | A1* | 1/2005 | Stringham | G06Q 30/02 700/223 |
| 2006/0168074 | A1* | 7/2006 | Gardner | H04L 51/12 709/206 |
| 2006/0229058 | A1* | 10/2006 | Rosenberg | H04W 4/029 455/404.2 |
| 2008/0092239 | A1* | 4/2008 | Sitrick | G06F 21/10 726/27 |
| 2008/0109317 | A1* | 5/2008 | Singh | G06Q 30/02 705/14.5 |
| 2009/0063274 | A1* | 3/2009 | Dublin, III | G06Q 30/02 705/14.1 |
| 2012/0179606 | A1* | 7/2012 | Sagi | G06Q 10/103 705/40 |
| 2012/0179766 | A1* | 7/2012 | Gracy | G06Q 10/107 709/206 |
| 2012/0179909 | A1* | 7/2012 | Sagi | G06F 21/6218 713/167 |
| 2013/0254897 | A1* | 9/2013 | Reedy | G06F 21/10 726/26 |
| 2014/0092778 | A1* | 4/2014 | Weber | H04L 12/2816 370/254 |
| 2014/0189018 | A1* | 7/2014 | Nawaz | G06Q 50/32 709/206 |
| 2014/0223573 | A1* | 8/2014 | Reedy | G06F 21/6218 726/26 |
| 2016/0278558 | A1* | 9/2016 | Ansari | H04W 4/12 |
| 2016/0358123 | A1* | 12/2016 | Pancari | G06Q 10/107 |
| 2017/0352122 | A1* | 12/2017 | Markarian | B07C 3/14 |

OTHER PUBLICATIONS

International Search Report and Written Opinion for Corresponding International Application No. PCT/EP2017/074230 (11 Pages) (dated Oct. 16, 2017).

\* cited by examiner

DIGITAL MAILBOX

CROSS-REFERENCE TO RELATED APPLICATIONS

This application is a 371 of PCT/EP2017/074230, filed Sep. 25, 2017, which claims the benefit of Italian Patent Application No. 102016000097485, filed Sep. 28, 2016.

FIELD OF THE INVENTION

The present invention relates to a digital mailbox, namely a device for sending and receiving electronic files.

TECHNOLOGICAL BACKGROUND OF THE INVENTION

It is well-known that the traditional postal system consists of hand-delivered mail in paper format.

The drawbacks often encountered in the traditional modes of handling the postal services are known:
- losses of time in the initial correspondence dispatching phases, phases that necessarily require an access to a public premise with a mailbox for letters or a post office;
- losses of time in the sender's waiting phases in the post offices;
- the time needed for shunting and forwarding the correspondence to the addressees, which may also be subject to substantial delays;
- the chances of mislaying the letters in a shunting and forwarding phase;
- the chances of a missed observance of the confidentiality of the contents of the letters, due to an improper inspection of their contents.

Only in the last few decades, thanks to the advent of computer technology, traditional mail is supported by e-mail, both in the form of regular emails, as well as in PEC (Posta Elettronica Certificata).

It is also known that e-mail can be the cause of a variety of issues including spam, that is, receiving large amounts of unwanted and often fraudulent messages.

Another problem associated with this latter one is given by the fact that e-mail can contain viruses or other malware that, especially in the case of low-tech users, can damage files stored in a computer's memory or make it useless.

A further problem is that e-mail communications can be intercepted by malicious hackers with possible loss of sensitive data and lack of privacy.

Especially sophisticated hackers may be able, in some cases, to access encrypted emails with the ensuing problems.

Document WO2015/177819 describes a postal system in which the delivery of the user's mail is performed not in the form of paper documents, but in the form of digital documents.

Such system avails itself of a telematic network spread aver the territory served by the postal services characterized by:
- informatics "server" units, each of which is destined for managing the correspondence incoming to and outgoing from the users resident in a certain geographical area of usage;
- informatics "router" units, capable of interconnecting various server units;
- informatics units known as "internal modules", each allocated inside the domicile or site of each user and provided with software and hardware for managing the data with:
  - first memories for the registration of said correspondence files and a data base containing the details of all the users, and a third memory registering a private encryption/decryption key reserved for the user of said memory, while preferably being allocated in a mobile memory support reserved for the same
  - a software capable of reading and writing said memories and formatting the outgoing correspondence;
  - and further characterized by the presence of means capable of transferring to and from the relative server the correspondence outgoing and incoming from and to the mentioned internal module of each user.

This document, while describing a postal system for sending digital documents, describes a connection between an external module and its associated internal modules in terms of USB ports or in terms of a wireless connection.

The document above also does not specify how a file that is downloaded to the external module is then directed to the addressee's correct internal module.

A first technical problem left unsolved by the document above mentioned is the fact that a USB or even a wireless connection between the external module and the internal module is not able to cover large distances such as those required in a block of apartments or of offices distributed over an area of consistent size. A USB cable is generally 2 to 5 meters long at maximum. Additionally, in the case of a wireless connection, known confidentiality problems of downloaded files may arise.

A second problem arises from the installation costs of the described system, which must include a power supply line that is separated from the data line.

An object of the present invention is to provide a device especially designed to offer a new communication tool and a service not yet present on the market for the final customer, namely electronic mail delivered at the domicile (PED).

Another object of the invention is to create an electronic mail service that does not require the use of the Internet.

Another object of the invention is to create a system that can be installable and manageable at the same containing the costs.

Not the least object of the invention is to create a system that solves the aforementioned paper and electronic mail problems.

SUMMARY OF THE INVENTION

Said aims are obtained by a device for sending and receiving files in electronic form, wherein said files comprise metadata comprising an electronic address of an addressee and wherein the device comprises at least:
- a first internal module for sending and receiving files in electronic form;
- a second external module for sending and receiving files in electronic form associated to a building and placed in a position accessible to an operator;
- an electronic connection between the first internal module and the second module to allow to send and receive files in electronic form between the first and the second module and vice versa;
- a power supply system for the first internal module and the second external module;

wherein the first internal module is configured to receive files in electronic form by accessing the second external module connected to the first internal module and to transfer to the second external module files in electronic format stored in a memory of the first internal module as a result of an authorized access to the second external module and wherein the second external module is configured to allow the download or the upload of files in electronic format, characterized in that the power supply system for the first internal module and the second external module is a common system that operates using Power over Ethernet (PoE) technology and by the fact that the electronic address of the addressee contained in the metadata of the file received by the second external module comprise a MAC address univocally associated to the internal module of the addressee.

Among the advantages of the invention is the fact that the use of Power over Ethernet (PoE) technology far from being an obvious choice allows the following advantages to be achieved, while at the same time allowing data transmission on the same cable.

First, said choice allows to power both devices by using only one twisted pair cabling, saving on installation costs and on additional cable purchases.

Secondly, it is by using Ethernet technology that the system is allowed to operated optimally.

Indeed, in the specifications of that technology it is provided to assign a unique address, referred to as MAC (where MAC stands for Media Access Control), also called physical address, namely a uniquely assigned 48 bit (6 byte) code from the manufacturer to any Ethernet or wireless network card produced in the world.

Therefore, the invention described above allows each addressee to be assigned a unique association between its postal or civic address and the MAC address of the addressee's internal module so that by incorporating such information into the metadata of the file in electronic format to be transferred, it is sufficient to use a single external module without mass memory and equipped with a single USB port, said external module can possibly be integrated into a pre-existing interphone apparatus of a condominium.

In addition, the invention ensures the confidentiality of the content of the correspondence sent, avoids the possibility of spam and avoids the problems associated with the possibility that hackers may send viruses via email, as well as allows users to send mail without having to move from home or from office while not using the Internet.

Not using the Internet, among other things, avoids in one stroke all the communication security issues of the Internet.

It should also be noted that the external module, in this embodiment of the invention, does not have its own memory, making it impossible fraudulent removal of data and of postal communications by breaking-in the external module itself.

Further features of the invention can be deduced from the dependent claims.

BRIEF DESCRIPTION OF THE DRAWINGS

Further features and advantages of the invention will become apparent by reading of the following description provided by way of non-limiting example, with the help of the figures illustrated in the attached Figures, in which.

DETAILED DESCRIPTION OF THE DRAWINGS

In a preliminary fashion, for a better understanding of the invention it is noted that it uses Power over Ethernet (PoE) technology, which also makes available the physical address or MAC address of an electronic device such as an Ethernet card which it is uniquely determined and identified.

In addition, electronic files transferred via this technology may include metadata that, in addition to the sender and addressee information, including their civic addresses, also includes the MAC address uniquely associated with the addressee's internal module.

The invention will now be described with reference initially to FIG. 1, which illustrates a first embodiment of the present invention, particularly suitable for a single home office or a business.

Figure 1:
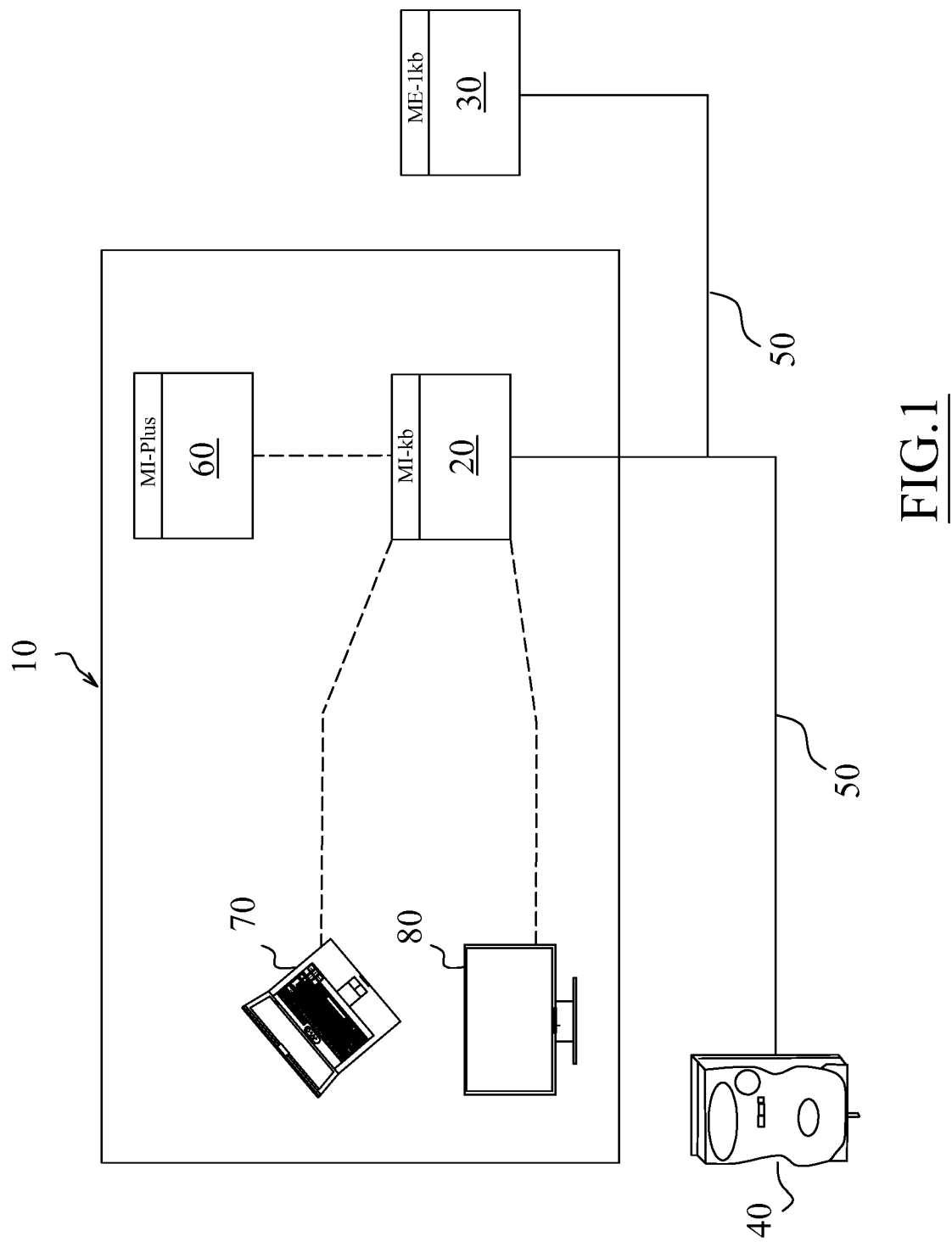
FIG. 1 illustrates a first embodiment of the present invention.

In particular, FIG. 1 shows an external module 30 (also referred to as ME-1 kb), namely a device installed outside the home (or office) and connected via an UTP/STP Ethernet twisted pair 50 with an internal module 20 (also indicated with MI-kb), installed inside the home (or office).

The external module 30 and the internal module 20 cooperate to receive and send files in electronic format as further specified in the following description.

In particular, the external module 30 may interface and communicate with the internal module 20 by means of a dedicated management software through an external access port.

The external module 30 may allow anyone with the right credentials (for example, a digital mail service provider), to access the external module 30 to allow download and/or upload of the files sent and/or received in a secure and certified manner.

For example, digital mail files delivered via the external module 30 are transferred to an internal memory of the internal module 20 and can be picked up and viewed by the addressee via external memory, PC 70 or viewed on a television screen 80 and/or printed by a printer.

In the example of FIG. 1, it can be noted that the internal module 20 (shown in FIG. 1 as MI-kb) is installed inside a building, whether it is a home or an office, and connected via UTP cable to the external module 30 (shown in FIG. 1 as ME-1 kb).

The power supply of both the internal module 20 and the external module 30 can be realized, for example, by the PoE (Power over Ethernet) technology connected to the individual electrical energy consumption counter 40.

This choice enables both devices to be powered by just one twisted cable, saving on installation costs and on additional cable purchases.

As clearly shown in FIG. 1, the internal module 20 can interface by means of the Wi-Fi protocol and the software dedicated to another additional 60, also referred to as MI-Plus.

Additional module 60 is not strictly necessary for system operation, but its use guarantees a number of additional benefits.

The additional module 60 can be implemented using a handheld device that functions as a GUI (Graphical User Interface) and offers greater convenience and potential for using the digital mailbox, especially to older or less prone people in using computers, as an embedded device has dedicated software for displaying and creating files to be sent, exploiting the digital postal system of the present invention through simple and intuitive steps.

Figure 2:
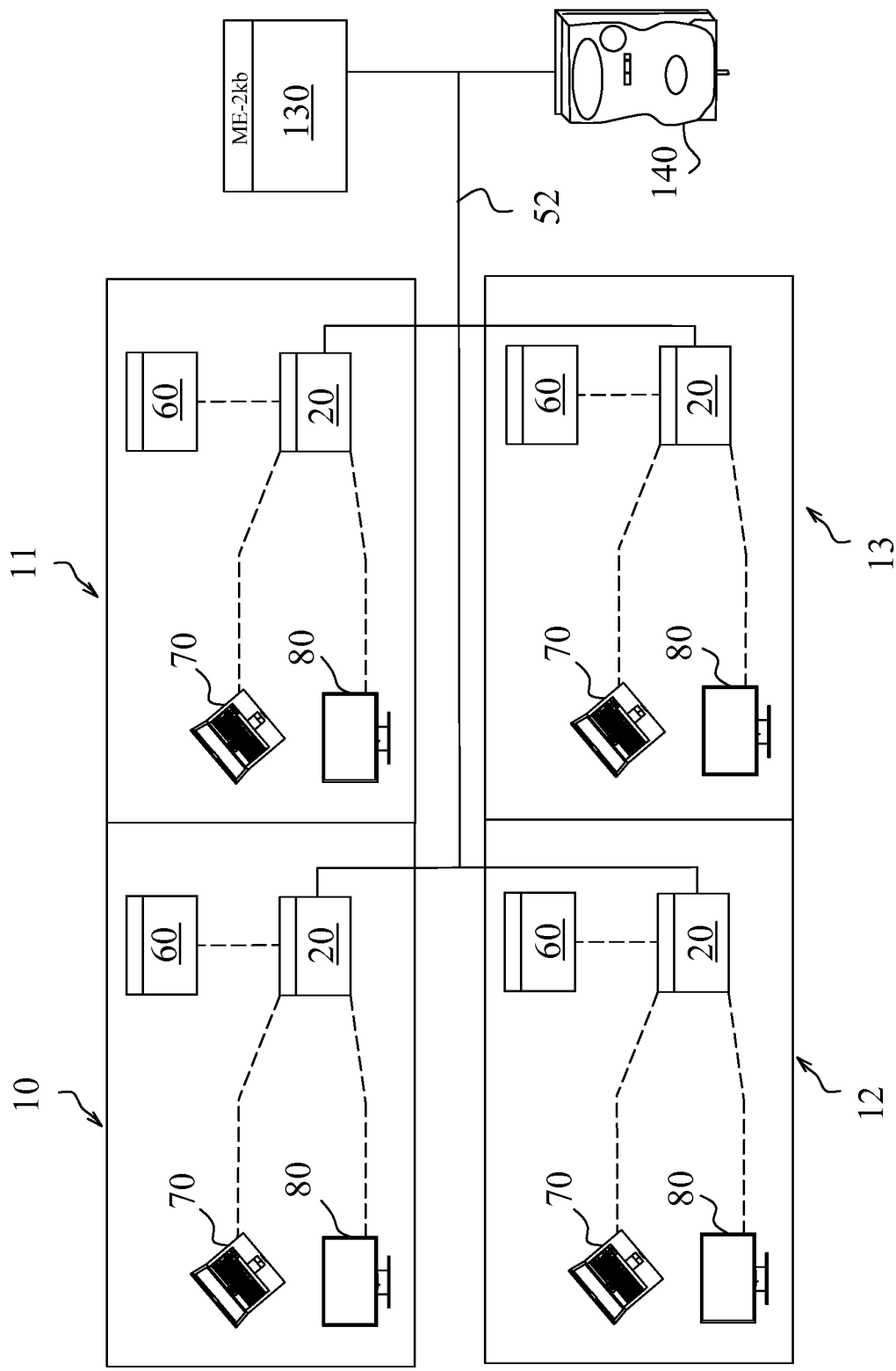
FIG. 2 illustrates a second embodiment of the present invention.

The internal module 20 can also interface via USB or HDMI to other commonly used devices to maximize the experience and convenience of the digital mailbox, such as a PC 70 or a TV 80 with one of these connection ports and thanks to the supplied software, the domiciled digital mail can be controlled easily and comfortably. This allows the user to decide the preferred way to look at mail. FIG. 2 illustrates a second embodiment of the present invention suitable for apartments or groups of offices.

As can be seen, within each sub-area 10-13 of the building, the internal module 20 remains unchanged and does not need any modification, thanks to the modular solution chosen.

Therefore, within each sub-area 10-13 there is provided an internal module 20 (or MI-kb) for each sub-area, where such internal modules 20 are interconnected via an UTP Ethernet cable to the outside where it is installed a single external module 130 (also referred to as ME-2 kb) that differs in terms of technical aspect and data routing capabilities compared to the external module 30 (or ME-1 kb), as further illustrated below.

All devices, i.e. the internal modules 20 and the external module 130, are powered by the common main line (such as the condominium counter 140) with PoE technology.

Each internal module 20 of a particular sub-area retains the same features and capabilities as described in FIG. 1, without any limitation or modification, as these features remain unchanged. As can be seen from FIGS. 1 and 2, one of the concepts on which the present invention is based is to make the entire system modular so as to minimize installation and installation costs using a minimal product but at the same time giving the opportunity where needed or required to expand it and thus make a flexible and expandable system in line with user requests.

Figure 3:
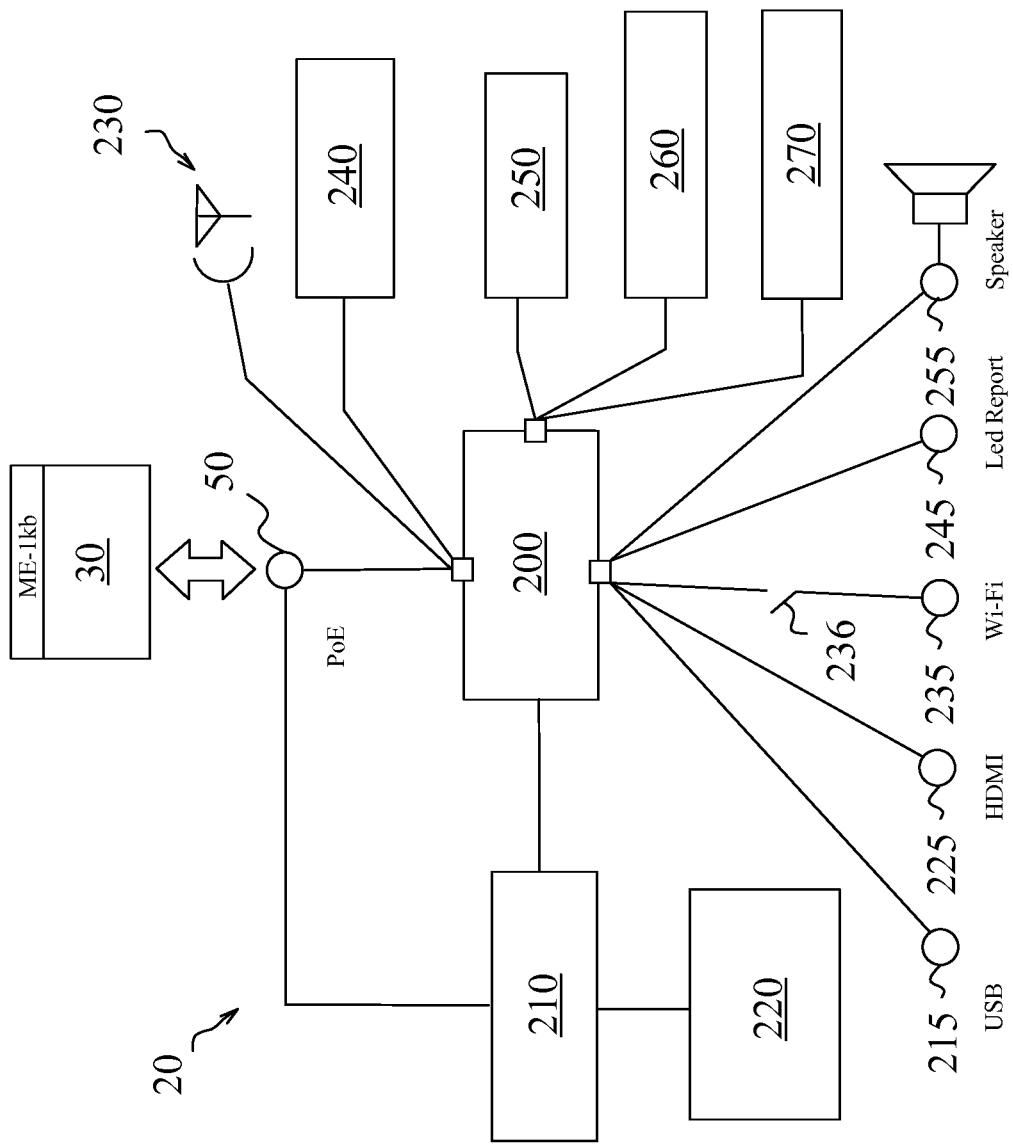
FIG. 3 shows a block diagram of an internal module belonging to the present invention.

FIG. 3 is a block diagram of the architecture of an internal module 20 (or MI-kb).

Such a device may comprise a main control unit 200 for managing the data flow and the resources of the internal module 30 for its normal operation.

The internal module 20 also includes an EEProm 250 memory where the firmware and the essential data for the internal module 20 reside, a main memory 260 having sufficient space for the embedded or dedicated operating system, for example: 2 Gbytes on Flash architecture to minimize the space and a secondary memory 270 whose dimensions are not predetermined, for example, to use a microcard reader, dedicated to the user's data.

The internal module 20 also includes a Sim/microSim card 240 reader to allow the payment of digital mail or other services, an antenna 230 for connection and use of the SIM/mSIM.

The internal module 20 may also include a lithium-ion internal battery 220 to provide device functionality even in the absence of a temporary power supply and a power manager 210, namely an integrated circuit that manages the battery charging or battery functions in case of absence of power supply.

The internal module 20 may also include an Ethernet port 50 for connection to the external module 30,130, a USB port 215, an HDMI 225 port, a Wi-Fi antenna 235, one or more Leds 245 for visual notifications to the user (example: green Led running system, blue Led to notify outbound mail, flashing green inbound mail, red Led battery use, etc.); and a 255 speaker for any system notifications.

The internal module 20 may also include a On-Off switch 236 to enable and disable the Wi-Fi line.

Not all listed components are strictly necessary for minimum system operation, such as USB port 215, HDMI port 225, Wi-Fi antenna 235, Leds 245, speaker 255, and battery 210, can also be omitted to reduce production costs.

Figure 4:
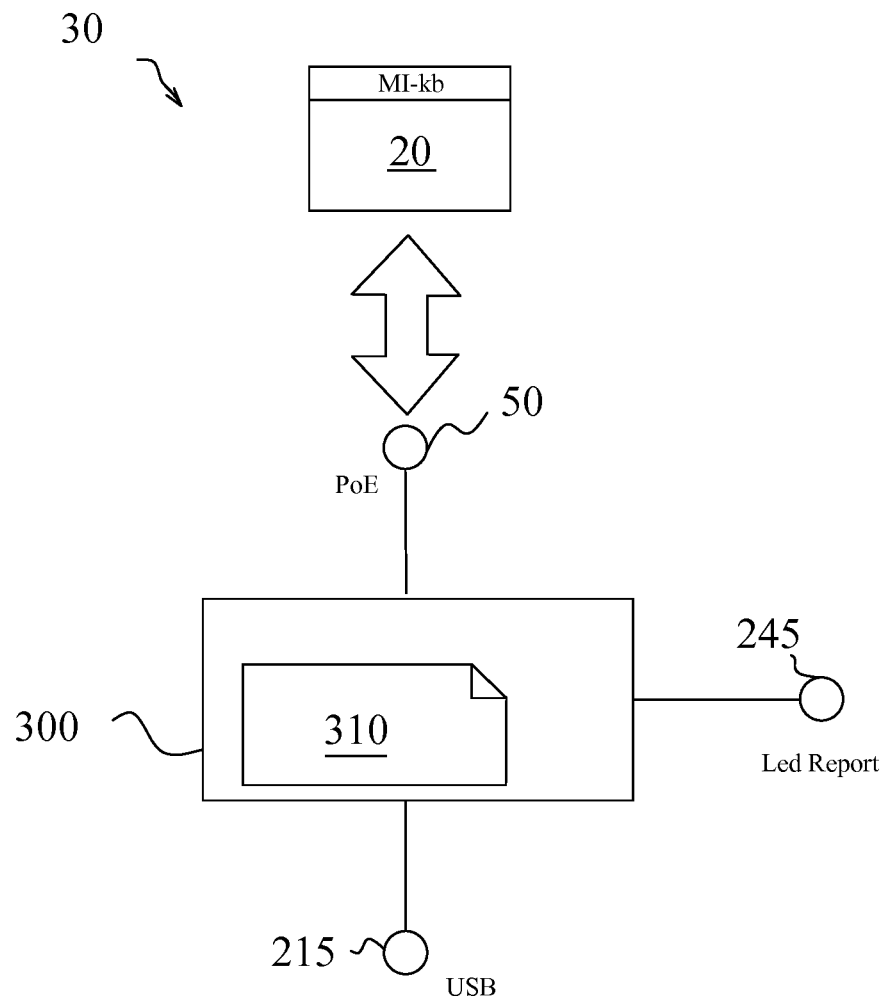
FIG. 4 shows a block diagram of an external module belonging to the present invention.

FIG. 4 shows the block diagram of the external module 30 (or ME-1 kb) used for the base kit of the digital mailbox as a solution for houses and/or single offices.

This external module includes a two-way Ethernet-USB converter circuitry 300, equipped with a physical firewall 310 that allows external access from USB only through specific credentials, a USB port 215, where it is preferable the USB 3.0 technology with latest generation data transfer performance and an Ethernet port for connection to the internal module 20 as well as a report Led 245, visible from the outside for system notifications.

Figure 5:
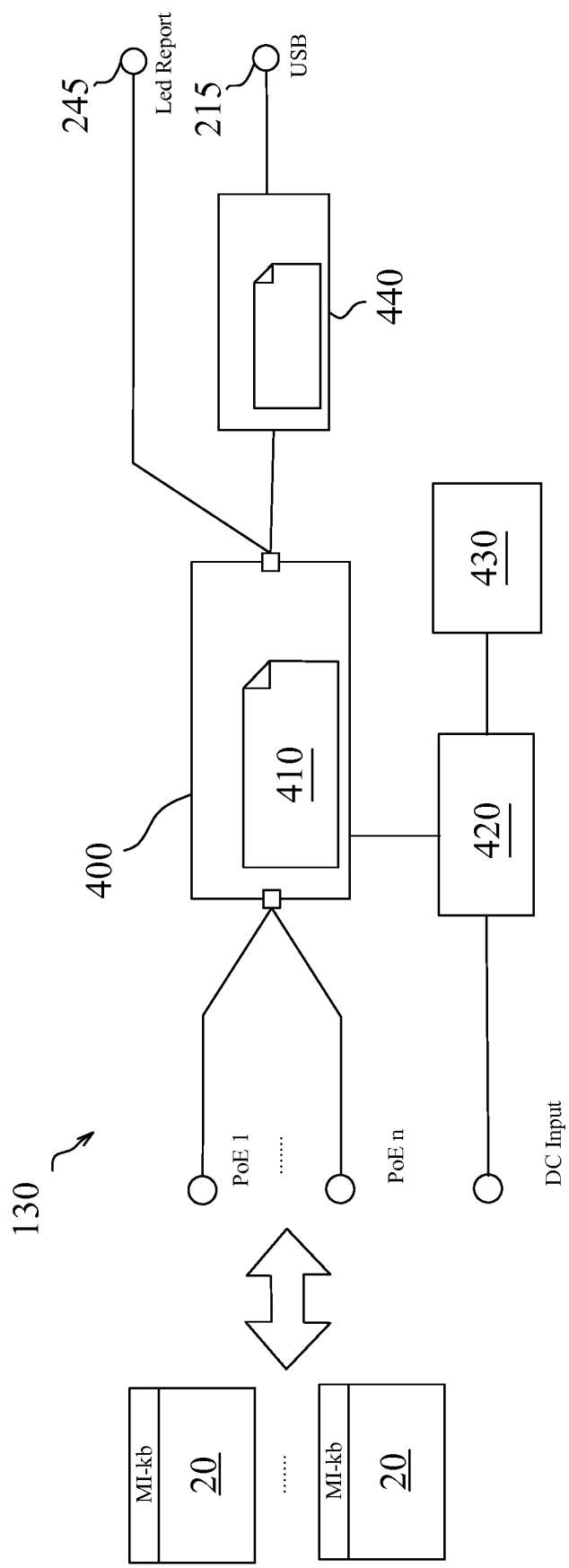
FIG. 5 shows a block diagram of a second type of external module belonging to the present invention.

FIG. 5 shows the block diagram of the external module 130 (or ME-2 kb), which includes a switch device 400 to which n Ethernet ports are connected.

This device is a network device for data routing within the home or office digital mailbox network by means of physical addresses (MAC) preloaded in memory in the routing table and a Port security system implemented to prevent computer attacks on the connection ports.

The external module 130 also includes N Ethernet ports that allow communication from the access point to the desired i-th address with the i-th internal module (MI-kb), a power manager 420, and a lithium battery 430 useful in the absence of power supply, a two-directions Ethernet-USB signal converter 440, a USB port 215 for external access, and a report Led 245 for system notifications. It should be noted that in the external modules 30,130 the communication port of the USB type can be replaced with any other type, such as Wi-Fi or Bluetooth.

In any case, a physical connection is preferable to those of a frequency type for security reasons and interception by unauthorized individuals.

Moreover, in an alternative version of the invention (not shown for simplicity), the internal module and the outer module coincide.

Figure 6:
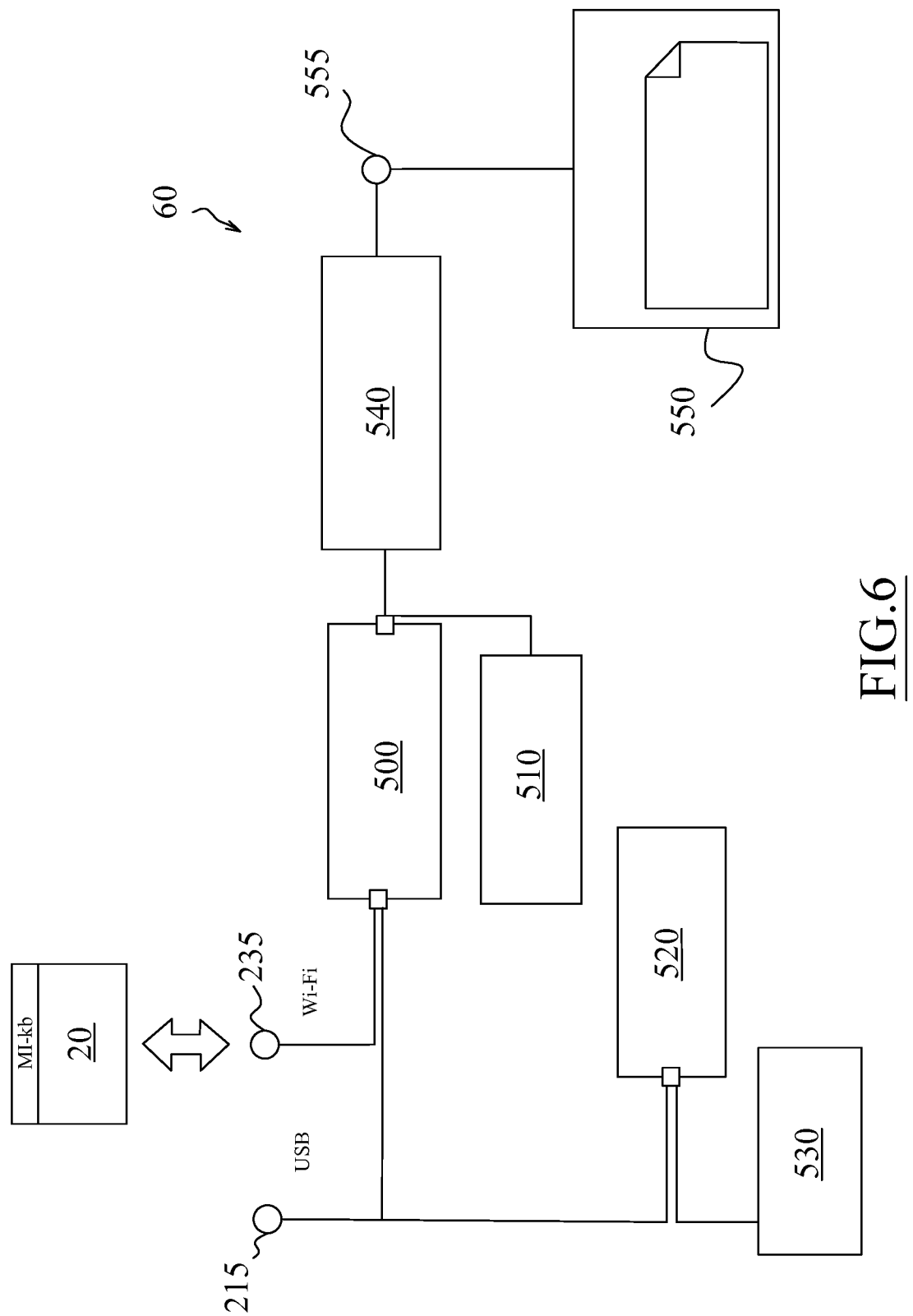
FIG. 6 shows a block diagram of an additional module, according to an embodiment of the present invention.

FIG. 6 describes an additional module 60 (also known as MI-Plus) useful to provide the full features and capabilities of the digital mailbox through the implementation of a dedicated software for the management and use of the digital mailbox by the user by means of a simple and intuitive interface.

Such additional module 60 comprises a control unit 500 for data management and loading of the operating system and embedded software, a main memory 510 where the operating system and the use software reside, a secondary memory for the proper operation of the device, a graphic user interface 550, a USB interface 215 for external connections and/or power supply, and a lithium rechargeable battery 530 for normal operating functions through a power supply manager 520 and a Wi-Fi connection interface to connect to the internal module 20.

The aforementioned additional module 60 is nothing other than the user interface, deliberately made separate from the internal module, to allow the user to use dedicated applications to improve and facilitate the use of the invention itself. It allows to use and consult mail at any point in the home, whether it's living room, bathroom, bedroom or office. In addition, it allows to write and/or create digital documents to be sent comfortably seated. The above-mentioned invention can be realized both by means of independent devices, but it is well suited because of its modular nature also to be integrated into an existing interphone or video interphone device for further reduction of the costs associated with the purchase and installation (see FIGS. 15-16 better described below).

The invention also comprises an interphone device provided with a single USB port 215.

Figure 7:
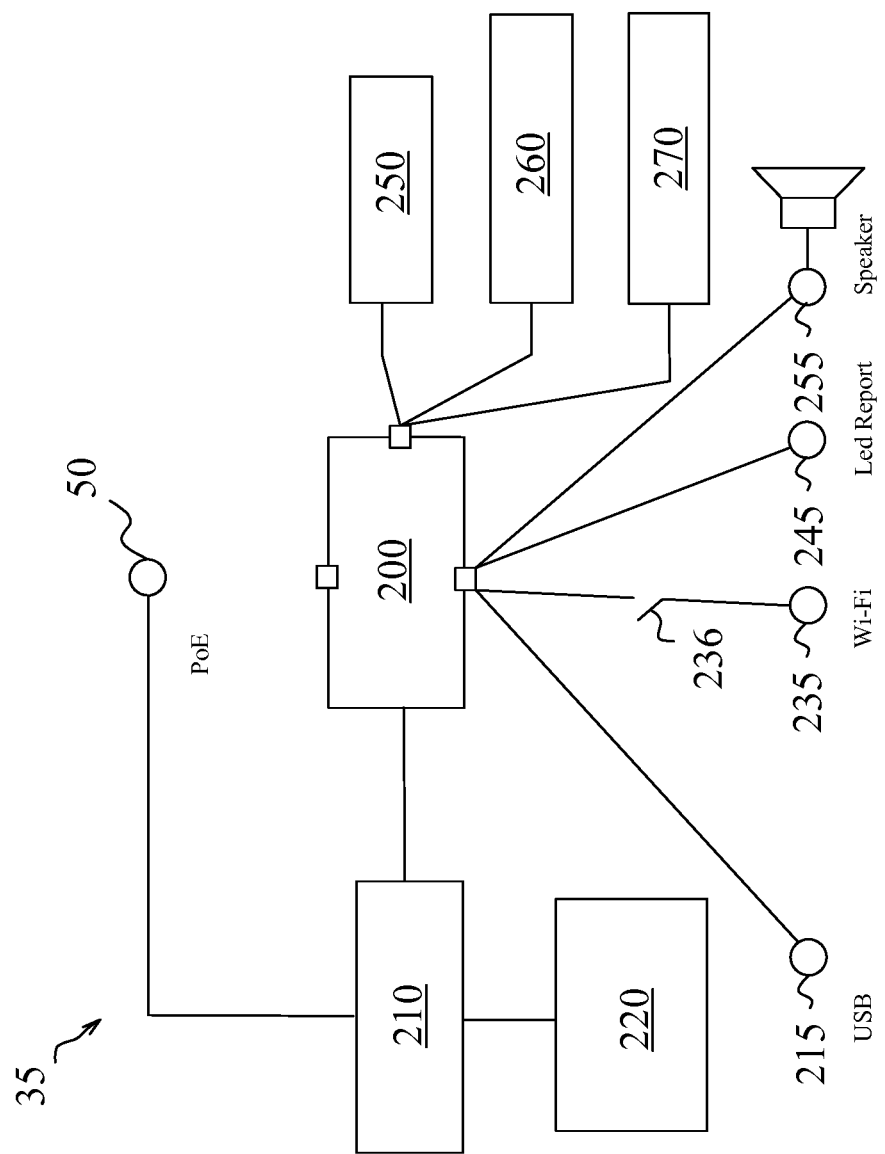
FIG. 7 shows a block diagram of a further embodiment of the present invention.

FIG. 7 shows a block diagram relating to a further embodiment of the present invention, i.e. a digital mailbox 35 that integrates in a single physical location the features presented in the internal modules 20 (MI-kb) and the outer module 30 (ME-kb) for either the home or office solution, as well as the solution for apartments and offices.

The present configuration greatly reduces the production and installation costs associated with the main invention by virtualizing the digital data connection and routing function through an embedded software application.

The installation can be provided at a private property limit, in a place freely accessible by an operator of the domiciled electronic mail provider.

The digital mailbox 35 has a logical control unit 200 for data management and basic operation of the device itself, a power supply manager 210, a buffer battery 220 preferably installed to maintain operation even in the absence of a temporary power supply, an EEProm 250 memory containing the firmware for the basic functions of the device, a main memory 260 for loading the embedded (or dedicated) software of the device and a secondary memory 270 where the input and output data of the user (or of users) of digital mail are stored.

The digital mailbox 35 also has one or more USB interfaces 215, an optional Wi-Fi interface 235 for any secure connection with home-based user devices, one or more Led 245 for visual reporting functions, and an optional speaker 255 for sound notification functions.

The operation of the digital mailbox 35 will be described in greater detail in the final part of this description.

In the following there are some examples of possible project configurations that are by no means binding, but are useful to understand the enormous versatility of the project.

Figure 8:
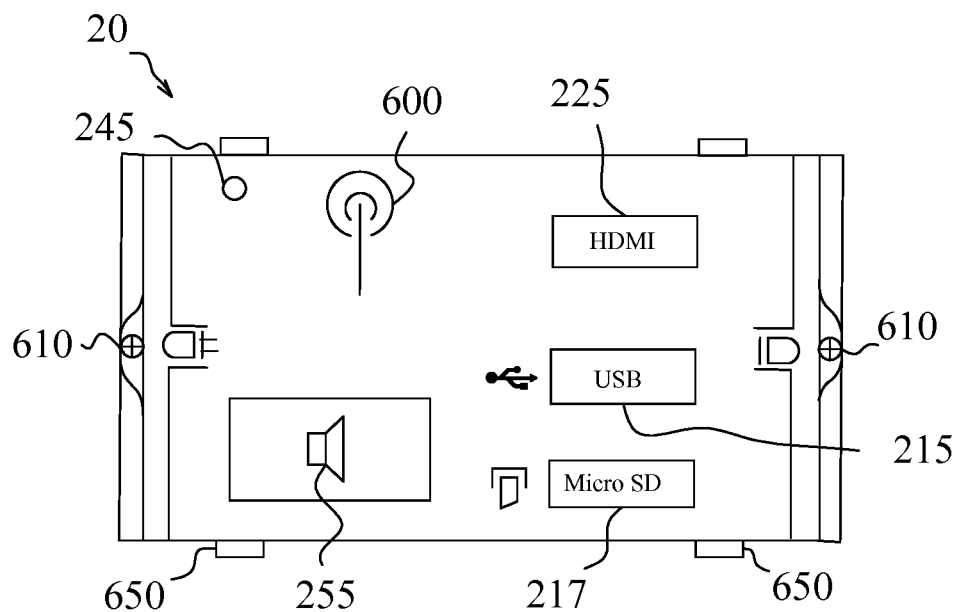
FIG. 8 shows a front view of an internal module according to a first embodiment.
Figure 9:
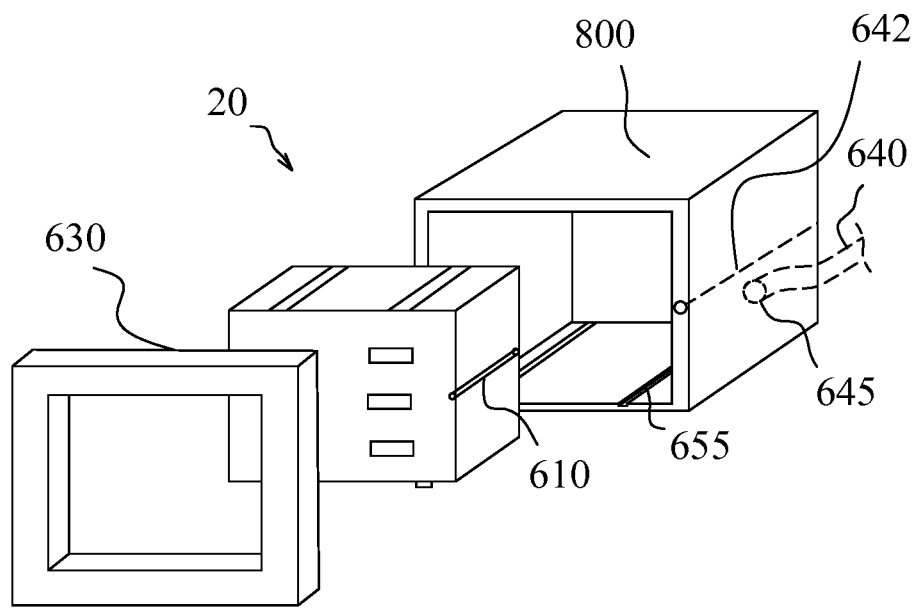
FIG. 9 shows an exploded view of the internal module of FIG. 8.

FIG. 8 shows a front view of an internal module 20 according to a first embodiment, that is, installed in an electric well 800, while FIG. 9 shows an exploded view of the internal module of FIG. 8.

The inner module 20 comprises a box body provided with a guide assembly 650 for engagement in corresponding grooves 655 of the electric well 800 and screws 610 engaging in holes 642 of the electric well 800.

In the electric well there is also provided a hole 645 for the exit of an UTP cable 640.

The box body is preferably protected by an outer frame 630 of plastic material.

On the front panel of the internal module 20 there is a power-on and shut-off key 600, a Led 245, a speaker 255 for any acoustic notifications, as well as an HDMI port 225 for connecting to a TV 80, a USB port 215 and a Micro SD slot 217.

Figure 11:
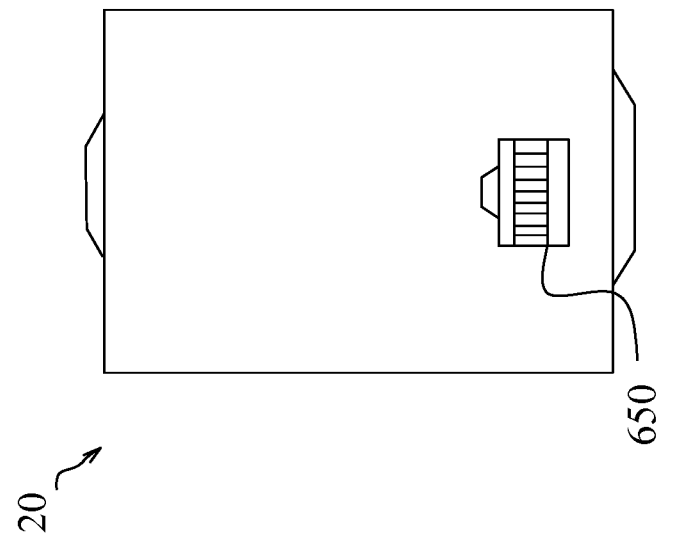
FIG. 11 shows a rear view of the internal module of FIG. 10.
Figure 10:
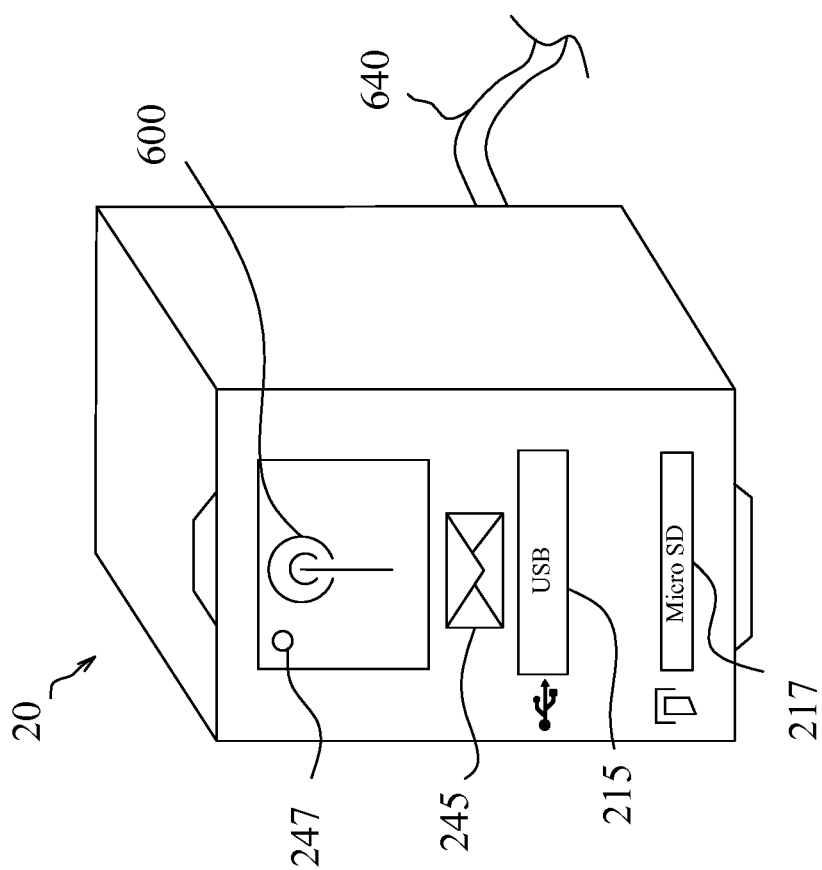
FIG. 10 shows a front view of an internal module according to a second possible embodiment.

FIG. 10 shows a front view of an internal module according to a second possible embodiment, while FIG. 11 shows a rear view of the internal module of FIG. 10.

In this version, the internal module 20 includes a box body with a front panel with a power-on and shut-off key 600, a Wi-Fi report Led 247, a report Led 245 signaling the presence of mail (with iconography representing an envelope), a speaker for any acoustic notifications (not shown for simplicity), a USB port 215 and a Micro SD slot 217, and possibly an HDMI port (not shown for simplicity) for connecting to a TV 80.

Figure 12:
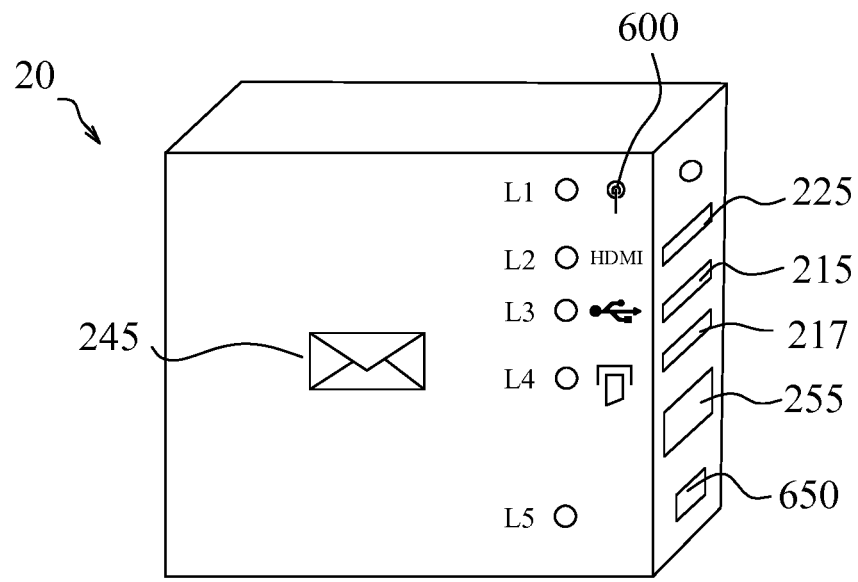
FIG. 12 shows a front view of an internal module according to a third embodiment.
Figure 13:
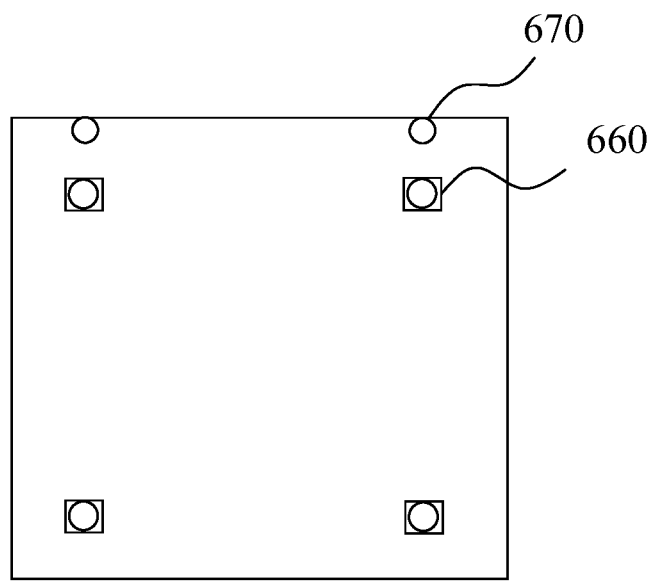
FIG. 13 shows a bottom view of the internal module of FIG. 12.

FIG. 12 shows a front view of an internal module according to a third embodiment, while FIG. 13 shows a bottom view of the internal module of FIG. 12.

Also in this version, the internal module 20 includes a box body with a front panel with a power-on and shut-off key 600, a Wi-Fi report Led 247, a report Led 245 for signaling the presence of mail (with envelope iconography), a speaker 255 for acoustical notifications, a USB port 215 and a Micro SD slot 217, as well as an HDMI port 255 for connecting to a TV 80.

As can be seen in FIG. 13, the module includes a set of support legs 660 and holes 670 for fixing at a wall with screws.

Figure 14:
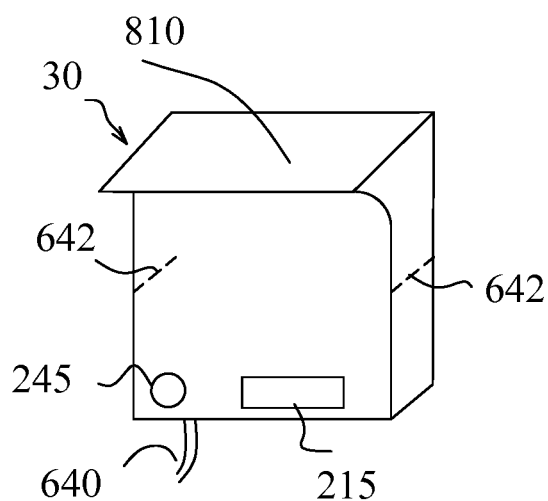
FIG. 14 shows a front view of an external module according to a first embodiment.
Figure 15:
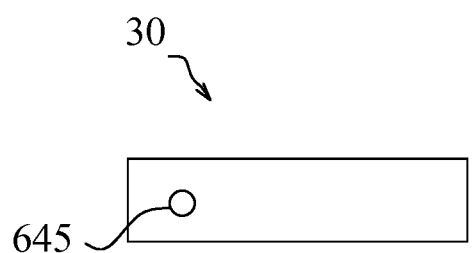
FIG. 15 shows a rear view of the external module of FIG. 14.

FIG. 14 shows a front view of an external module according to a first possible embodiment, while FIG. 15 shows a rear view of the external module of FIG. 14.

The external module 30 comprises a box body having a front panel on which is provided a report Led 245 for signaling the presence of mail 245 and a USB port 215 for accessing the data contained in the internal memory of the internal module 20 and for loading the incoming mail to the internal module 20 identified by the correct MAC address.

The external module 30 can be fixed by means of screws 642 to the outer wall of a building within which one or more internal modules are contained, as described above, and may be provided with a canopy 810 for shelter.

Figure 16:
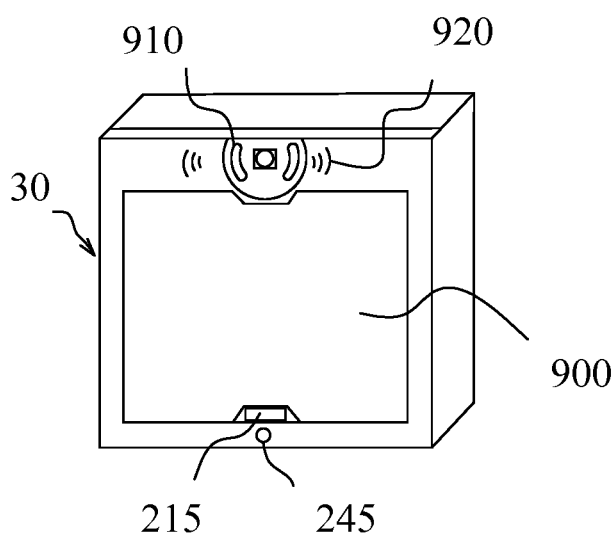
FIG. 16 shows a front view of an external module according to a further possible embodiment.
Figure 17:
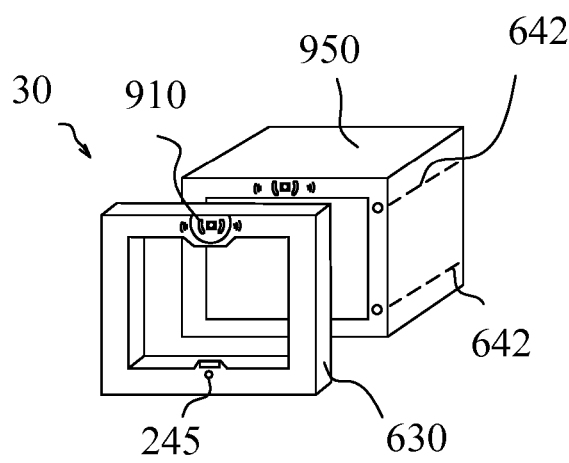
FIG. 17 shows an exploded view of the external module of FIG. 16.

FIG. 16 shows a front view of an external module according to a further possible embodiment, while FIG. 17 shows an exploded view of the external module of FIG. 16.

This external module is designed to integrate into a pre-existing video interphone system equipped with, for example, a touch screen monitor 900, acoustic means 920 and light means.

At minimum, the external module includes a USB port 215 and a Led 245, as well as an appropriate frame 630 that can be fixed by screws 642 to the body 950 of the video interphone system.

Figure 18:
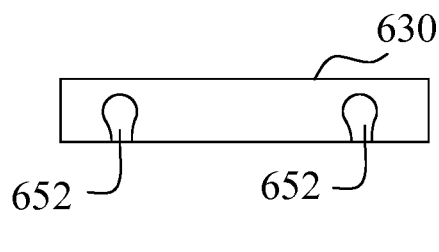
FIG. 18 shows a bottom view of a template belonging to the external module of FIG. 16.
Figure 19:
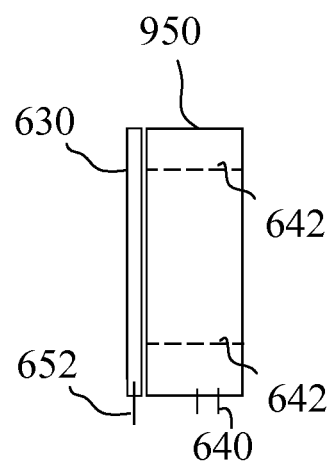
FIG. 19 shows a side view of the external module of FIG. 16.

FIG. 18 shows a bottom view of a mask 630 belonging to the external module of FIG. 16, while FIG. 19 shows a side view of the external module of FIG. 16.

The mask 630 includes screws 652 which allow it to be fixed to the body 950 of the video interphone, while the UTP cable 640 may be positioned below it.

Some examples of operation allow to fully understand the potentialities of the invention.

In a first possible case, an operator belonging to a provider company of a domiciled mail service must deliver some mail files sent from a sender A to an addressee B.

The operator using a portable electronic module containing the files to be delivered reaches the addressee's B building and physically connects his portable electronic module to the USB port of the addressee's external module 30,130.

In the context of the present invention, a portable electronic module is any electronic device capable of retaining in its own memory the electronic files to be delivered and to be connected to an external module, for example via USB.

The external module firewall checks the access and credentials of the operator, and if they are correct, switch 400 controls the address of the addressee required by the postal operator to allow the routing, in the affirmative, the internal module 20 of the addressee B and the postal operator communicate and, in case of confirmation by the software of the addressee's B correct identity, data transfer from the memory of the portable electronic module of the postal operator to an internal module memory 20 of addressee B is performed.

Upon completion of the operation and following confirmation of the system, the operator may disconnect and continue his work.

The transferred data remain in the memory of the internal module 20 and the dedicated software will activate the corresponding notification Led in the internal module 20 to communicate the arrival of the mail.

Addressee B can view the received mail on his PC by connecting it to the digital mailbox, through his TV set that has a USB, HDMI or Wi-Fi input to connect to it or by using the additional module 60 as a device user interface.

It should be noted that all mail files are marked in their metadata not only by the address of the addressee, but also by the physical address MAC of the addressee's internal module.

In case it is desired to send a file, the file can be by means of PC, TV or by means of the additional device 60 (MI-Plus) and by means of purchasing the shipping service by means of the digital mailbox directly from the credit of the integrated Sim, the object ready for shipment will remain in memory in the internal module waiting to be picked up by an operator.

The zone operator will then be notified of the presence of files to be picked up and, by means of his/her own portable electronic module (or mobile storage device), by reaching the corresponding external module, the files to be delivered to an addressee can be picked up.

It is therefore clear that each mail file contains the addressee's MAC address and the address of the sender so that the operator can identify the external module to which to connect to retrieve the outgoing file.

For better system operation, centralized servers can be provided that, for each predefined geographic area served by one or more operators, receive all the files to be delivered as they are brought and downloaded into that server from the operators and where operators can pick up the files to be delivered depending on the area served by each of the operators.

The operation of the digital mailbox 35 of FIG. 7 is as follows. The device installed at the private property limit, for example, by the side of the home door dwelling on the road, allows the USB interface 215 to connect to the domiciled electronic provider that has to deliver mail in electronic format into the digital mailbox 35 by means of a mobile storage device.

The digital mailbox software 35 provides synchronization with the operator device and verification of access credentials.

Only after such a verification operation has been successful the operator can download and upload the mail files in the digital mailbox 35 via their mobile device, which also verifies the integrity of the physical address of the machine is not corrupted and the compatibility of the postal address of the digital mailbox 35 with that of the virtual objects to be delivered.

Only if the mail addresses, such as country, city, postal code, Street/Square, name of the addressee match files will be transferred to the addressee's memory area in a virtual folder in the secondary memory of "Inbox mail".

If in a virtual folder "Outgoing mail" there are files for which the digital postage provided by the manager of the service is paid, they are downloaded into the memory of the service provider's mobile device, ready to be shipped and delivered to the marked address.

The report Led 245 will alert of a change of status of the memory and by using well-defined light signals defined by the provider of the service when the user returns home will know immediately if he has received mail by looking at the Led on the digital mailbox. At that point, if the digital mailbox 35 is assigned to a single user, the latter can retrieve the data by extracting the secondary memory from its accommodation if the memory is a SD or microSD, using a support memory device provided by handheld such as a portable flash memory to connect to the mailbox through a USB interface equipped with a unique identifier key or by connecting digital devices such as a PC or smartphone with a convenient Wi-Fi or USB connection and entering credentials to have access to the device.

The dedicated digital mailbox software 35 then controls the user's credentials and allows access to their hardware resources.

The same device will also be able to manage the configuration for multiple apartments and/or offices as the hardware architecture remains unchanged, while the software aspect has the following changes.

In case of multiple users for the same digital mailbox 35, each user will be further identified by a physical MAC address in order to associate that user with a dedicated digital mailbox 35 memory space for their inbound and inbound mail communications.

More specifically, secondary memory 270 will be partitioned into n parts, where n is the number of digital postal addresses active to the digital address of the digital mailbox, each partition being identified by a unique key assigned by the system being installed. This computer key corresponds to the complete digital mail address that the software will compile to route the files from the memory of the digital mail operator device to the partition indicated by the address. This operation recreates the connection between the external module (ME-kb) and the internal module (MI-kb) as in the other embodiments of the invention.

Below is an example of address table generated by the embedded (or dedicated) software of the digital mailbox 50 for routing the files of the domiciled electronic mail service.

| id_Partition | Nation | City | CAP | Index type | Addr. | N. | Name |
|---|---|---|---|---|---|---|---|
| 1 | Italy | Sovico | 20845 | Via | G. da Sovico | 35 | Pancari Massim. Antonio |
| 2 | ... | ... | ... | ... | ... | ... | ... |
| ... | ... | ... | ... | ... | ... | ... | ... |
| N | ... | ... | ... | ... | ... | ... | ... |

In this case, the secondary memory will not be removable for security and privacy reasons.

In general, the files contain metadata that includes an addressee's electronic address. The internal modules are connected to the external module for receiving and transmitting data, and all of these modules are powered in common by mean of Power over Ethernet (PoE) technology, which also allows the addressee's electronic address in the metadata of the files received from the external module to include a MAC address uniquely associated with the addressee's internal module. In the case of multiple internal modules in the same building, a switch device 400 to which several Ethernet ports are connected routes the file to the correct internal module.

The invention as described comprises be possible modifications or improvements determined by contingent or particular motivations, without thereby departing from the scope of the invention.

The invention claimed is:

1. A digital mailbox configured to send and receive files in electronic form, wherein said files comprise metadata comprising an electronic address of an addressee, wherein the digital mailbox comprises an address and wherein the digital mailbox comprises at least:
    a first internal module for sending and receiving files in electronic form;
    a second external module for sending and receiving files in electronic form associated to a building and placed in a position accessible to an operator;
    an electronic connection between the first internal module and the second external module to allow to send and receive files in electronic form between the first and the second module and vice versa; and
    a power supply system configured to supply power to the first internal module and the second external module;
    wherein the first internal module is configured to receive files in electronic form by accessing the second external module connected to the first internal module and to transfer to the second external module files in electronic form stored in a memory of the first internal module as a result of an authorized access to the second external module and wherein the second external module is configured to allow download or upload of files in electronic form, from or to a memory of a digital mail operator device;
    wherein:
        the power supply system for the first internal module and the second external module is a common system that operates using Power over Ethernet (PoE) technology and by the fact that the electronic address of the addressee contained in the metadata of the file received by the second external module from the first internal module comprises a Media Access Control (MAC) address univocally associated to the first internal module of the addressee; and
        the digital mailbox comprises a secondary memory partitioned into n parts, where n is a number of digital postal addresses active at the digital address of the digital mailbox, each partition being identified by a unique key assigned by the system being installed, the unique key corresponding to the complete digital mail address to route the files from the memory of a digital mail operator device to the partition indicated by the complete digital mail address.

2. The digital mailbox of claim 1, wherein the power system for the first internal module and the second external module is connectable to an electric counter or to a respective internal battery to provide power even during temporary absence of a main power supply with help of a related power management circuit.

3. The digital mailbox of claim 1, wherein a plurality of first internal modules are connected to only one external module and the second external module comprises a switch device for routing the files in electronic form to the correct MAC address of the internal module of the addressee.

4. The digital mailbox of claim 1, comprising an additional module associable to the first internal module and concretized by means of a portable device that serves as a graphical interface for an user.

5. The digital mailbox of claim 1, wherein the first internal module comprises a control unit, a EEProm memory in which firmware and essential data for the internal module are stored, a main memory having sufficient space for the operating system dedicated to the internal module and a secondary memory for postal data of an user.

6. The digital mailbox of claim 5, wherein the first internal module further comprises a Subscriber Identity Module Sim/microSIM card reader to allow payment of transfer services of files in electronic format and an antenna for access and use of the Subscriber Identity Module SIM/microSIM card.

7. The digital mailbox of claim 5, wherein the first internal module includes an Ethernet port for connection to the second external module, a Universal Serial Bus (USB) port, a High-Definition Multimedia Interface (HDMI) port, an antenna wireless fidelity (Wi-Fi), one or more Light Emitting Diodes (LEDs) for visual notifications, a speaker for any system notifications and a On-Off switch to activate or deactivate a Wi-Fi line.

8. The digital mailbox of claim 1, wherein the second external module comprises a bi-directional Ethernet-Universal Serial Bus (USB) converter circuit, provided with a physical firewall that allows external access to USB only through specific credentials, a USB port, and means for the connection to the first internal module.

9. The digital mailbox of claim 8, wherein a single USB port of the second external module is embedded in an interphone device.

10. The digital mailbox of claim 1, wherein the first internal module and the second external module are both integrated in a same physical location placed in a position accessible to the operator.

* * * * *